(12) United States Patent
Kahle et al.

(10) Patent No.: US 6,672,898 B2
(45) Date of Patent: Jan. 6, 2004

(54) DUPLEX CONNECTORS FOR OPTICAL FIBER PLUG-IN CONNECTORS

(75) Inventors: Eberhard Kahle, Berlin (DE); Detlev Thalemann, Berlin (DE)

(73) Assignee: Krone GmbH, Berlin-Zehlendorf (DE)

( * ) Notice: Subject to any disclaimer, the term of this patent is extended or adjusted under 35 U.S.C. 154(b) by 0 days.

(21) Appl. No.: 10/258,002

(22) PCT Filed: Mar. 21, 2001

(86) PCT No.: PCT/EP01/03233
§ 371 (c)(1),
(2), (4) Date: Oct. 16, 2002

(87) PCT Pub. No.: WO01/79904
PCT Pub. Date: Oct. 25, 2001

(65) Prior Publication Data
US 2003/0190123 A1 Oct. 9, 2003

(30) Foreign Application Priority Data
Apr. 18, 2000 (DE) .......................................... 100 19 104

(51) Int. Cl.[7] .............................................. H01R 13/60
(52) U.S. Cl. ......................... 439/540.1; 385/59; 385/55; 385/56; 385/76
(58) Field of Search ......................... 439/540.1; 385/59, 385/56, 55, 53, 58, 76

(56) References Cited

U.S. PATENT DOCUMENTS

| | | | | |
|---|---|---|---|---|
| 4,953,929 A | * | 9/1990 | Basista et al. ................. 385/55 |
| 5,608,830 A | * | 3/1997 | Belenkiy et al. ............... 385/78 |
| 5,675,682 A | * | 10/1997 | De Marchi .................... 385/77 |
| 6,409,392 B1 | * | 6/2002 | Lampert et al. ............... 385/56 |
| 6,511,230 B1 | * | 1/2003 | Connelly et al. ............. 385/58 |

* cited by examiner

*Primary Examiner*—Tho D. Ta
(74) *Attorney, Agent, or Firm*—McGlew and Tuttle, P.C.

(57) ABSTRACT

The invention relates to a duplex plug-in connector for optical fiber connectors, comprising two fastening devices for receiving two simplex plug-in connectors (14) for forming a duplex plug-in connector (22), the fastening devices being designed in such a way that they at least partially enclose the connector housing (18) and/or a kink preventer (17) of a plug-in connector (14) to be received.

8 Claims, 3 Drawing Sheets

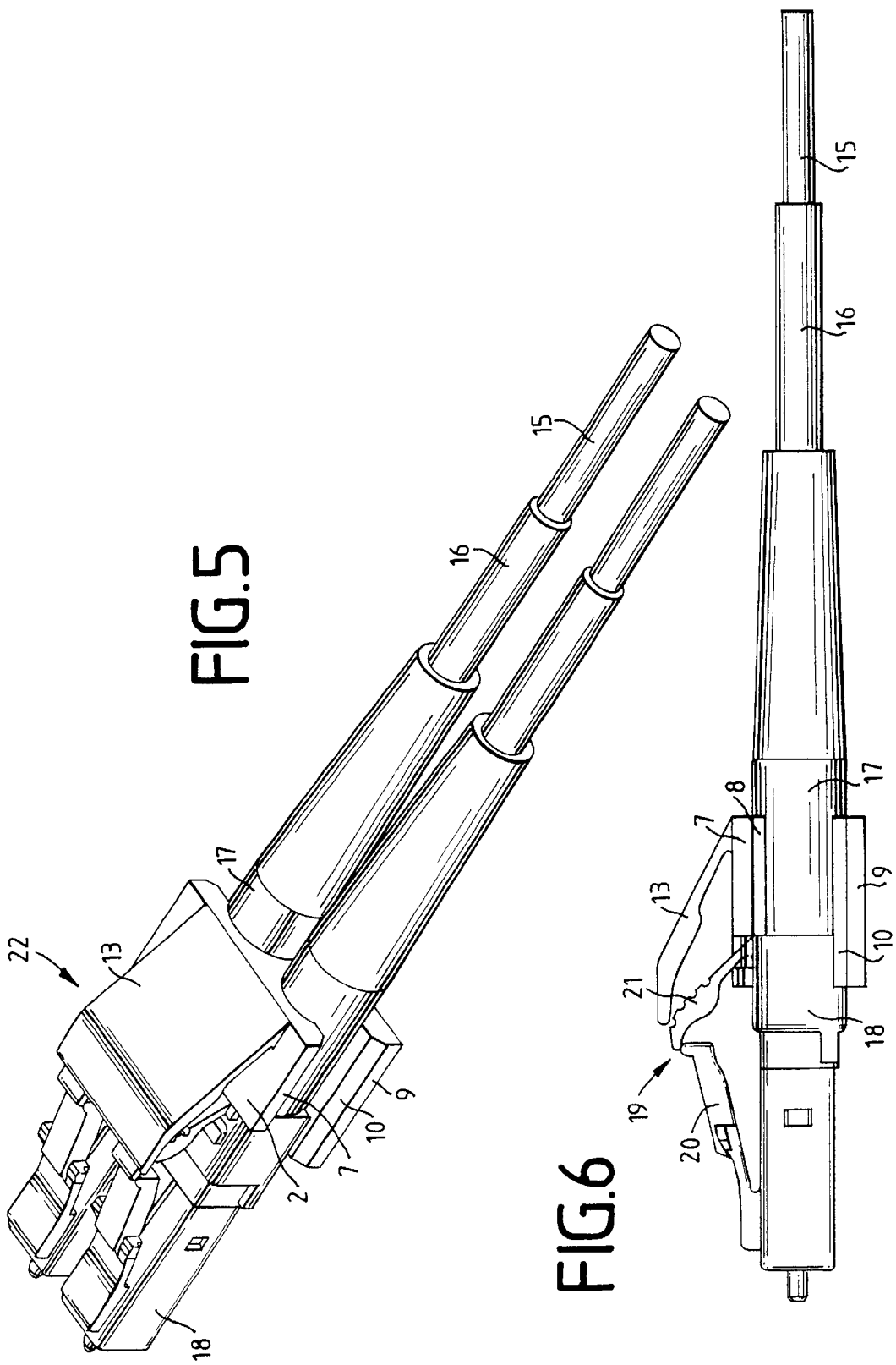

DUPLEX CONNECTORS FOR OPTICAL FIBER PLUG-IN CONNECTORS

FIELD OF THE INVENTION

The invention relates to a duplex connector, comprising two fastening devices for receiving two simplex plug-in connectors for forming a duplex plug-in connector.

BACKGROUND OF THE INVENTION

A duplex connector of the generic type in question is disclosed by U.S. Pat. No. 5,579,425. The duplex connector comprises a plate-shaped element, on the side walls of which two differently designed cylindrical pins are respectively arranged and can be inserted into corresponding holes in a connector housing of a simplex connector. Arranged on the upper side of the plateshaped element is a clip-shaped element, which in the assembled state engages around the latching clips of the simplex plug-in connectors, so that the two latching clips of the simplex plug-in connectors can be simultaneously released by actuation of the clip-shaped element. The simplex plug-in connectors are formed with holes on both sides of their housing, so that each simplex plug-in connector can be arranged on either side of the duplex connector. As a result, it is possible for example for the channels to be subsequently changed over by exchanging or changing the simplex plug-in connectors. Consequently, the duplex connector allows a duplex plug-in connector to be produced from two simplex plug-in connectors. A further advantage is that, when one simplex plug-in connector is defective, only this defective plug-in connector has to be exchanged. The disadvantage of the known duplex connector is the inadequate quality of the mechanical connection and its limited suitability for use.

SUMMARY OF THE INVENTION

The invention is therefore based on the technical problem of providing a duplex connector for optical fiber plug-in connectors which can be used universally and realizes an improved mechanical connection between a duplex connector and a plug-in connector.

According to the invention, a duplex connector is provided for optical fiber connectors, comprising two fastening devices for receiving two simplex plug-in connectors for forming a duplex plug-in connector. The fastening devices are designed in such a way that they at least partially enclose the connector housing and/or the kink preventer of a plug-in connector to be received. As a result, the plug-in connector to be received is securely clamped by the fastening device, the clamping forces being distributed around the plug-in housing in a way corresponding to the design of the fastening device. A further advantage of the duplex connector according to the invention is that it does not require any mechanical provisions on the plug-in connector itself As a result, the duplex connector can be used universally for plug-in connectors from various manufacturers.

In a preferred embodiment, the fastening devices are designed as C-shaped receptacles, so that they securely clamp the respective kink preventer in a resilient manner. In this case, the open legs of the C-shaped receptacle are preferably formed with a bevel in order to facilitate the insertion of the plug-in connector.

In a further preferred embodiment, a right-angled receptacle adjoins the C-shaped receptacle in the longitudinal direction of the duplex connector. This right-angled receptacle serves for securely clamping part of the connector housing. Consequently, the plug-in connector is securely clamped by the duplex connector on the kink preventer and the connector housing simultaneously, which brings about a particularly secure mechanical connection.

The right-angled receptacle is preferably essentially of an L-shaped form, the open legs preferably being formed with a bevel. Furthermore, the L-shaped receptacle is formed with a web which protrudes over the upper side of the connector housing.

In a further preferred embodiment, a clipshaped element is arranged on the upper side in such a way that, in the fastened state of the simplex plug-in connectors, it engages over the clips of the latter so that, by actuation of the clip-shaped element, the two clips of the simplex plug-in connectors are actuated simultaneously.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 5 is a duplex plug-in connection comprising a duplex connector and two simplex plug-in connectors in the assembled state; and FIG. 6 is a side view of the duplex plug in connection.

DESCRIPTION OF THE PREFERRED EMBODIMENT

Figure 1:
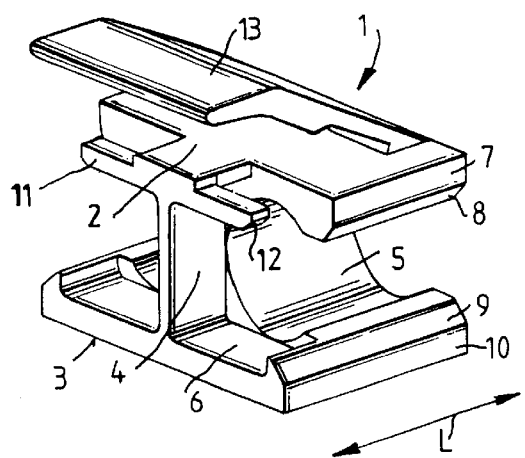
FIG. 1 is a perspective rear view of a duplex connector according to the invention.

Referring to the drawings in particular, the duplex connector 1 comprises an upper side 2 and a lower side 3, between which a web-shaped wall element 4 is centrally arranged. Arranged on each side of the wall element 4 is a C-shaped receptacle 5 and an L-shaped receptacle 6. The C-shaped receptacles 5 extend over the full width 3 of the duplex connector 1. The end faces 7 of the upper legs are formed with a bevel 8 and the end faces 9 of the lower legs are formed with a bevel 10. The end face 9 of the lower leg extends over the full length L of the duplex connector 1, whereas the end face 7 extends only as far as the L-shaped receptacle 6. Arranged parallel to the upper side 2 of the duplex connector 1 in the region of the L-shaped receptacle 6 is a web 11, which is somewhat narrower than the width B of the duplex connector 1. The web 11 is likewise formed with a bevel 12. The length of the C-shaped receptacle 5 is in this case somewhat more than twice the length of the L-shaped receptacle 6. Arranged on the upper side 2 is a clip-shaped element 13, which extends at an angle from the front side to the rear side and goes into a part parallel to the upper side 2.

Figure 2:
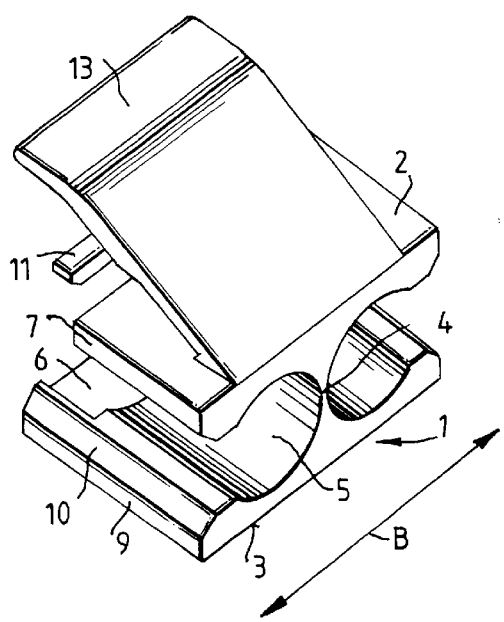
FIG. 2 is a perspective front view of the duplex connector of FIG. 1.
Figure 3:
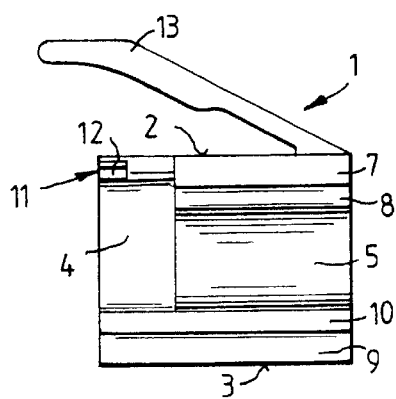
FIG. 3 is a side view of the duplex connector.
Figure 4:
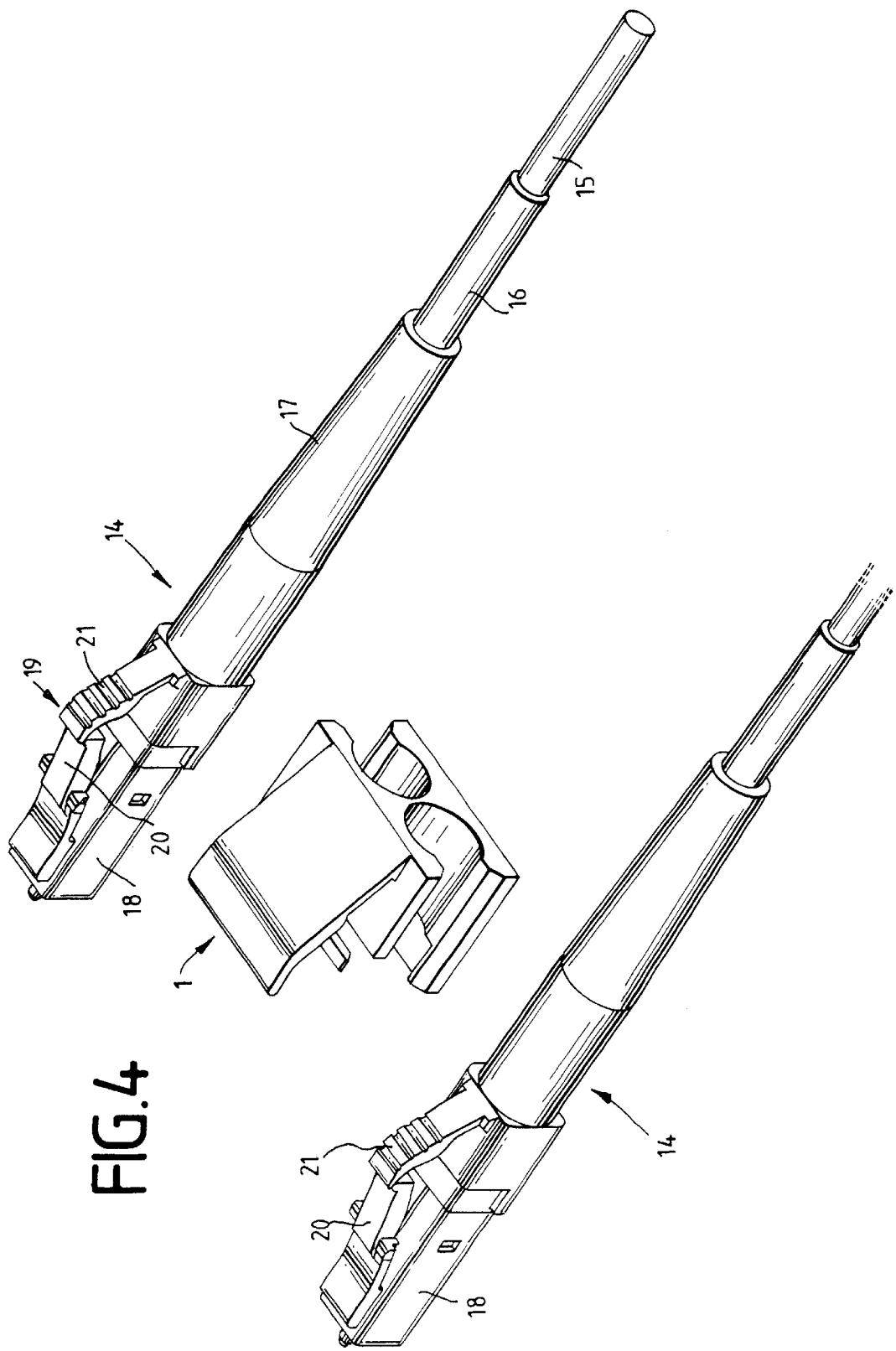
FIG. 4 is an exploded representation of the duplex connector with two simplex plug-in connectors.

Represented in FIG. 4 is the duplex connector 1 from FIGS. 1–3, with two simplex plug-in connectors 14. The two simplex plug-in connectors 14 are of a completely identical construction. Each simplex plugin connector 14 comprises the actual optical fiber cable 15, a cable sheath fixing means 16, a kink preventer 17 and the connector housing 18. The kink preventer 17 is made up of a conical part and a cylindrical part, the cylindrical part facing the connector housing 18. Arranged on the connector housing 18 is a snap clip 19, which serves for latching and releasing the plug-in connector 14 in a corresponding receptacle. The connector housing 18 itself is of an essentially cuboidal design. The snap clip 19 is made up of a latching clip 20 and a releasing clip 21, which is explained in more detail with reference to FIG. 6.

Represented in FIG. 5 is the complete duplex plug-in connector 22. In this case, the cylindrical part of the kink preventer 17 is securely clamped in the C-shaped receptacle 5 and part of the connector housing 18 is securely clamped in the L-shaped receptacle 6. The lateral gripping of the end faces 7, 9 with their bevels 8, 10 around the receptacles 5, 6 makes the clamping connection mechanically very stable. The clip-shaped element 13 is in this case over both the clips 19 of the two simplex plug-in connectors 14, so that they can be simultaneously released.

As can be seen from FIG. 6, the releasing clips 21 are over the latching clips 20 and the clipshaped element 13 is over the releasing clips 21. If the duplex plug-in connector 22 is then fitted into a corresponding receptacle, the latching clips 20 latch into the receptacle. Pressure on the sloping part of the clip-shaped element 13 causes the releasing clips 21 likewise to be pressed downward. These in turn press the latching clips 20 downward, so that all the clips are unlatched and the duplex plug-in connector 22 can be released.

While specific embodiments of the invention have been shown and described in detail to illustrate the application of the principles of the invention, it will be understood that the invention may be embodied otherwise without departing from such principles.

What is claimed is:

1. A duplex connector for optical fiber connectors, the duplex connector comprising:
   two fastening devices for receiving two simplex plug-in connectors for forming the duplex plug-in connector, the simplex plug-in connectors each having a connector housing and/or a kink preventer wherein the fastening devices at least partially enclose the connector housing and/or a kink preventer of the plug-in connectors to be received, wherein the fastening devices are designed as C-shaped receptacles with adjoining right-angled receptacles.

2. The duplex connector as claimed in claim 1, wherein the right-angled receptacle is essentially of an L-shaped form.

3. The duplex connector as claimed in claim 1, further comprising: a clip-shaped element arranged on an upper side and providing a fastened state for the simplex plug-in connectors with the clip-shaped element engaging over clips of the simplex plug-in connectors.

4. A duplex plug-in connector as claimed in claim 1, wherein the simplex plug-in connectors comprise two simplex plug-in connectors.

5. An optical fiber duplex connector and simplex plug-in connectors combination, comprising:
   a first simplex plug-in connector with a connector housing and/or a kink preventer;
   a second simplex plug-in connector with a connector housing and/or a kink preventer; and
   a duplex connector with a first fastening device for receiving said first simplex plug-in connector and a second fastening device for receiving said second simplex plug-in connector, each of said first fastening device and said second fastening device at least partially enclosing a respective said connector housing and/or a kink preventer of said first simplex plug-in connector or said second simplex plug-in connector to be received, wherein the fastening devices are C-shaped receptacles for connection with a curved portion of the respective said connector housing and/or a kink preventer of said first simplex plug-in connector or said second simplex plug-in connector to be received and a right-angled receptacle adjoins the C-shaped receptacle for connection of said C-shaped receptacle with a curved portion of the respective said connector housing and/or a kink preventer of said first simplex plug-in connector or said second simplex plug-in connector to be received and for connection of an adjacent right-angled portion of the respective said connector housing and/or a kink preventer of said first simplex plug-in connector or said second simplex plug-in connector to be received.

6. The duplex connector as claimed in claim 5, wherein the right-angled receptacle is essentially of an L-shaped form.

7. The duplex connector as claimed in claim 5, further comprising: a clip-shaped element arranged on an upper side and providing a fastened state for the simplex plug-in connectors with the clip-shaped element engaging over clips of the simplex plug-in connectors.

8. An optical fiber duplex connector, comprising:
   a first simplex plug-in connector with a cylindrical part or tapered part having a curved surface and an adjacent first flat surface and a second flat surface forming an angle therebetween;
   a second simplex plug-in connector with a cylindrical part or tapered part having a curved surface and an adjacent first flat surface and a second flat surface forming an angle therebetween;
   a duplex connector part with a first fastening portion with a curved surface receptacle for receiving said first simplex plug-in connector curved surface and an adjacent flat surface receptacle for receiving said first simplex plug-in connector first flat surface and a second flat surface forming an angle and a second fastening portion with a curved surface receptacle for receiving said second simplex plug-in connector curved surface and an adjacent flat surface receptacle for receiving said second simplex plug-in connector first flat surface and a second flat surface forming an angle.

* * * * *